US010046269B2

(12) United States Patent
Murai et al.

(10) Patent No.: US 10,046,269 B2
(45) Date of Patent: Aug. 14, 2018

(54) ACIDIC GAS ABSORBING AGENT, METHOD FOR REMOVING ACIDIC GAS AND APPARATUS FOR REMOVING ACIDIC GAS

(71) Applicant: KABUSHIKI KAISHA TOSHIBA, Minato-ku (JP)

(72) Inventors: Shinji Murai, Sagamihara (JP); Yasuhiro Kato, Kawasaki (JP); Takehiko Muramatsu, Yokohama (JP); Satoshi Saito, Yamato (JP); Daigo Muraoka, Kawasaki (JP); Yukishige Maezawa, Hachioji (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 11 days.

(21) Appl. No.: 15/089,915

(22) Filed: Apr. 4, 2016

(65) Prior Publication Data

US 2016/0296882 A1    Oct. 13, 2016

(30) Foreign Application Priority Data

Apr. 9, 2015 (JP) ................................. 2015-080099

(51) Int. Cl.
*B01D 53/14* (2006.01)

(52) U.S. Cl.
CPC ..... *B01D 53/1493* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS 6,514,327 B1 * 2/2003 Burge ..................... C04B 22/08
106/14.05
8,685,418 B2 * 4/2014 Thompson ............. A61K 45/06
424/400
(Continued)

FOREIGN PATENT DOCUMENTS

AU    2014277692 A1    7/2015
AU    2015201648 A1    11/2015
(Continued)

OTHER PUBLICATIONS

"1-(cyclohexylamino)-2-propanol Safety Data Sheet." Sigma-Aldrich, Nov. 21, 2014.*
(Continued)

*Primary Examiner* — Daniel Berns
(74) *Attorney, Agent, or Firm* — Oblon, McClelland, Maier & Neustadt, L.L.P.

(57) ABSTRACT

There are provided an acidic gas absorbing agent that is large in recovery amount of an acidic gas. The acidic gas absorbing agent comprising an amine compound represented by general formula (1), and an acidic gas removing method and an acidic gas removing apparatus using the absorbing agent:

$$R^1_{R^2}\!\!>\!\!N-\underset{R^4}{\overset{R^3}{\underset{|}{C}}}-\underset{}{\overset{R^5}{\underset{|}{CH}}}-OH \quad (1)$$

wherein $R^1$ represents a cycloalkyl group having 3 to 6 carbon atoms; $R^2$ represents an alkyl group having 1 to 3 carbon atoms or a hydrogen atom; $R^3$ and $R^4$ each indepen-
(Continued)

dently represent an alkyl group having 1 to 3 carbon atoms or a hydrogen atom; and $R^5$ represents an alkyl group having 1 to 3 carbon atoms.

11 Claims, 1 Drawing Sheet

(52) U.S. Cl.
CPC .............. *B01D 2252/20405* (2013.01); *B01D 2252/20426* (2013.01); *B01D 2252/20431* (2013.01); *B01D 2252/20447* (2013.01); *B01D 2252/20484* (2013.01); *B01D 2252/602* (2013.01); *B01D 2258/0283* (2013.01); *Y02C 10/06* (2013.01)

(56) References Cited

U.S. PATENT DOCUMENTS

| | | |
|---|---|---|
| 9,446,346 B2 | 9/2016 | Murai et al. |
| 2012/0161071 A1 | 6/2012 | Murai et al. |
| 2012/0308451 A1 | 12/2012 | Murai et al. |
| 2013/0101667 A1 | 4/2013 | Thompson et al. |
| 2015/0174530 A1 | 6/2015 | Murai et al. |
| 2015/0298054 A1 | 10/2015 | Muraoka et al. |
| 2016/0136568 A1 | 5/2016 | Murai et al. |

FOREIGN PATENT DOCUMENTS

| | | |
|---|---|---|
| AU | 2015255195 A1 | 6/2016 |
| CN | 102553395 A | 7/2012 |
| CN | 104740976 A | 7/2015 |
| EP | 2 468 385 A2 | 6/2012 |
| EP | 2 468 385 A3 | 6/2012 |
| EP | 2 529 824 A1 | 12/2012 |
| EP | 2 889 073 A1 | 7/2015 |
| EP | 2 933 008 A1 | 10/2015 |
| EP | 3 020 464 A1 | 5/2016 |
| KR | 101398620 B1 | 5/2014 |
| WO | WO 2014/104789 A1 | 7/2014 |

OTHER PUBLICATIONS

"1-(cyclohexyl(methyl)amino)propan-2-ol." Debyesci.com product page, (c)2009-2014.*
Enamine, Ltd., "Safety Data Sheet for 1-[cyclopentyl(ethyl)amino]butan-2-ol, Product Catalogue #BBV-32083567." Published Jun. 2, 2015.*
Enamine, Ltd., "Safety Data Sheet for 1-[cyclopentyl(ethyl)amino]propan-2-ol, Product Catalogue #BBV-32083566." Published Jun. 2, 2015.*
Enamine, Ltd., "Safety Data Sheet for 1-(cyclopentylamino)pentan-2-ol, Product Catalogue #BBV-34720358." Published Jun. 2, 2015.*
Enamine, Ltd., "Safety Data Sheet for 1-(cyclopentylamino)propan-2-ol, Product Catalogue #EN300-169334." Published Jun. 2, 2015.*
Enamine, Ltd., "Safety Data Sheet for 1-[cyclopentyl(methyl)amino]-3-methylbutan-2-ol, Product Catalogue #BBV-42954000." Published Jun. 2, 2015.*
Enamine, Ltd., "Safety Data Sheet for 1-[cyclopentyl(methyl)amino]propan-2-ol, Product Catalogue #BBV-32083504." Published Jun. 2, 2015.*
Extended European Search Report dated Jul. 27, 2016 in Patent Application No. 16163583.4.

* cited by examiner

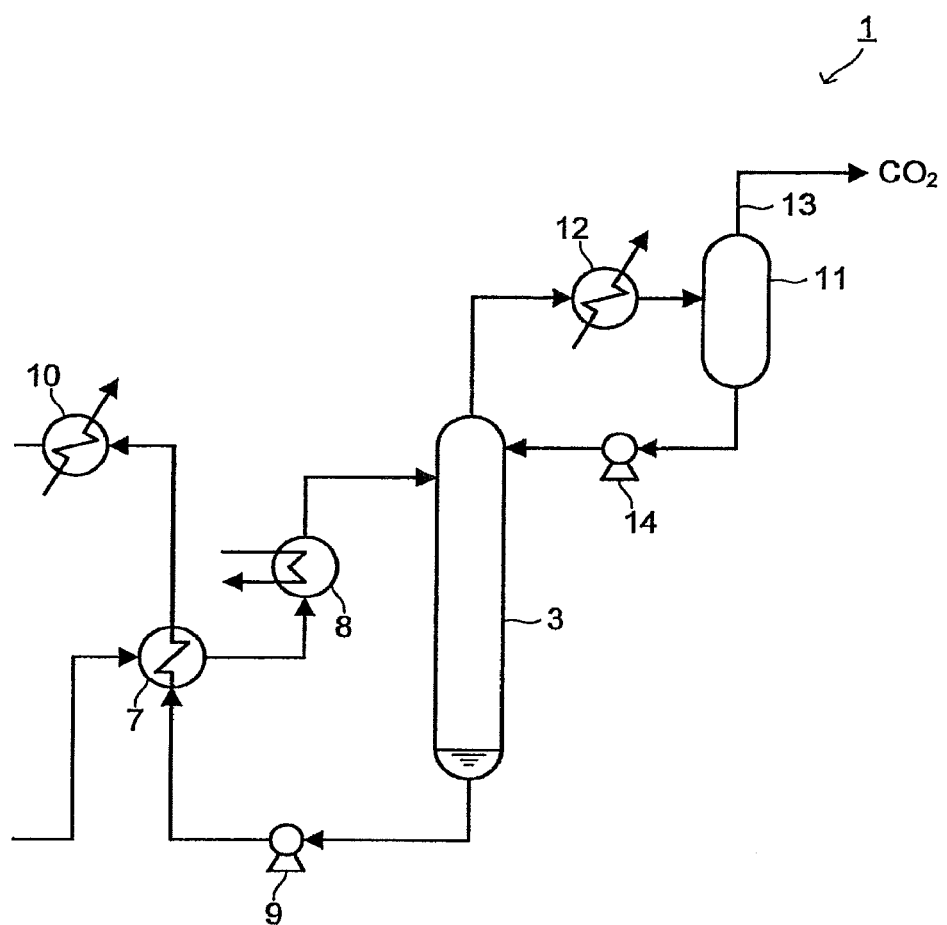

ACIDIC GAS ABSORBING AGENT, METHOD FOR REMOVING ACIDIC GAS AND APPARATUS FOR REMOVING ACIDIC GAS

CROSS REFERENCE TO RELATED APPLICATIONS

This application is based upon and claims the benefit of priority from the prior Japanese Patent Application No. 2015-80099, filed on Apr. 9, 2015, the entire contents of which are incorporated herein by reference.

BACKGROUND OF THE INVENTION

Field of Invention

Embodiments of the present invention relate to an acidic gas absorbing agent, a method for removing an acidic gas, and an apparatus for removing an acidic gas.

Background Art

A greenhouse effect through an increase in concentration of carbon dioxide ($CO_2$) has recently been pointed out as a cause of a global warning phenomenon, and an urgent task is to implement an international environment protection measure on a global scale. The emission of $CO_2$ is mainly derived from industrial activity, and a momentum towards the suppression of $CO_2$ emission has been increased.

Techniques for the suppression of an increase in the concentration of acidic gases including $CO_2$ include the development of energy saving products, techniques for the utilization of acidic gases as resources and isolation and storage of acidic gases, conversion to alternative energy such as natural energy and nuclear energy that do not emit acidic gases. Techniques for the separation and recovery of acidic gases being emitted are known as one of such techniques.

Acidic gas separation techniques studied up to now include absorption, adsorption, membrane separation, and cryogenic separation methods. Among them, the absorption method is suitable for massive treatment of gases and is under studies on application to plants and power generation stations.

A method in which combustion exhaust gases that are emitted in combustion of fossil fuels are brought into contact with a chemical absorbing agent to remove and recover $CO_2$ contained in the combustion exhaust gas, and a method that stores the recovered $CO_2$ are known as methods that are mainly intended, for example, for facilities such as thermal power stations using fossil fuels (for example, coal, petroleum, and natural gas). Further, a method in which acidic gases such as hydrogen sulfide ($H_2S$) other than $CO_2$ are removed using chemical absorbing agents has been proposed.

In general, alkanolamines exemplified by monoethanolamine (MEA) have been developed as chemical absorbing agents used in the absorbing method around 1930s and have also currently been used. This method that uses alkanolamines is cost-effective and, further, an increase in size of removing apparatuses is easy.

Alkanolamines used in the absorbing method include monoethanolamine, 2-amino-2-methyl-1-propanol, methylaminoethanol, ethylaminoethanol, propylaminoethanol, diethanolamine, methyldiethanolamine, dimethylethanolamine, diethylethanolamine, triethanolamine, and dimethylamino-1-methylethanol.

In particular, primary monoethanolamines are advantageously high in reaction rate and thus have been extensively used but, on the other hand, suffer from problems of corrosive properties against metals and the like, high susceptibility to deterioration, and high energy required for regeneration. On the other hand, tertiary methyldiethanolamines are advantageously less corrosive and further low in energy required for regeneration but, on the other hand, suffer from a problem of absorption rate. Accordingly, the development of novel absorbing agents that can overcome these drawbacks have been demanded.

In recent years, among amine compounds, particularly alkanolamines having a structural steric hindrance have been studied as acidic gas absorbing agents. The alkanolamines having a steric hindrance are advantageously very high in the degree of selectivity for acidic gases and are low in energy required for regeneration.

A method is known that uses, as the alkanolamine, alkanolamines with branched alkyl groups bonded to a nitrogen atom. As long as the present inventors know, such alkanolamines have a high level of carbon dioxide absorption property, but on the other hand, has an unsatisfactory level of carbon dioxide releasing property and, at the same time, suffer from a problem of a relatively high level of heat of reaction with the acidic gas. On the other hand, a method is also known that uses, as the absorbing agent, cycloamines that are amine compounds having a structure different from that of the alkanolamine compound.

PRIOR ART DOCUMENTS

Patent Documents

Patent document 1: U.S. Pat. No. 4,112,052
Patent document 2: Japanese Patent No. 2871334
Patent Document 3: Japanese Patent Application Laid-Open No. 13400/2008

SUMMARY OF THE INVENTION

Problems to be Solved by the Invention

An object of the present invention is to provide an acidic gas absorbing agent that is large in recovery amount of an acidic gas [that is, (absorption amount of an acidic gas at a low temperature)−(desorption amount of the acidic gas at an elevated temperature)], particularly an acidic gas absorbing agent that can allow the acidic gas to be easily desorbed at an elevated temperature and, at the same time, is free from coagulation even at low temperatures, and an acidic gas removing apparatus and an acidic gas removing method using the acidic gas absorbing agent.

Means for Solving the Problems

According to an aspect of the present invention, there is provided an acidic gas absorbing agent comprising an amine compound represented by general formula (1):

[Chemical formula 1]

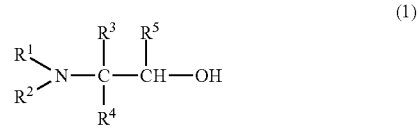

wherein $R^1$ represents a cycloalkyl group which has 3 to 6 carbon atoms and in which a part of hydrogen atoms is substituted or unsubstituted by an alkyl group having 1 to 3 carbon atoms; $R^2$ represents an alkyl group having 1 to 3 carbon atoms or a hydrogen atom; $R^3$ and $R^4$ each independently represent an alkyl group having 1 to 3 carbon atoms or a hydrogen atom; and $R^5$ represents an alkyl group having 1 to 3 carbon atoms.

According to another aspect of the present invention, there is provided a method for removing an acidic gas, the method comprising bringing a gas containing an acidic gas into contact with the above acidic gas absorbing agent to remove the acidic gas from the gas containing the acidic gas.

According to a further aspect of the present invention, there is provided an acidic gas removing apparatus comprising:

an absorber that brings a gas containing an acidic gas into contact with the above acidic gas absorbing agent to absorb the acidic gas in the acidic gas absorbing agent, thereby removing the acidic gas from the gas containing the acidic gas; and a regenerator that desorbs the acidic gas from the acidic gas absorbing agent with the acidic gas absorbed therein to regenerate the acidic gas absorbing agent, the acidic gas absorbing agent regenerated in the regenerator being reutilized in the absorber.

Effect of the Invention

The acidic gas absorbing agent according to one aspect of the present invention is high in the absorption amount of acidic gases, for example, carbon dioxide, and allows acidic gases to be easily desorbed at elevated temperatures and thus can realize the recovery of a large amount of carbon. Further, the heat of reaction in the absorption of carbon dioxide is low.

The acidic gas removing method and the acidic gas removing apparatus using the above acidic gas absorbing agent according to aspects of the present invention can realize the recovery of acidic gases in an efficient, cost-effective and stable manner.

Further, the acidic gas absorbing agent according to one aspect of the present invention is less likely to attack metallic materials such as carbon steels, as compared with alkanolamine compounds such as monoethanolamines that have hitherto been used as acidic gas absorbing agents. Accordingly, for example, in plant construction, there is no need to use expensive high-grade corrosion-resistant steels, contributing to an advantageous cost.

BRIEF DESCRIPTION OF THE DRAWINGS

FIG. 1 is a schematic view of an acidic gas removing apparatus in an embodiment.

MODE FOR CARRYING OUT THE INVENTION

Embodiments of the present invention will be described in more detail.

<Amine Compounds Represented by General Formula (1)>

The acidic gas absorbing agent according to one aspect of the present invention includes an amino acid salt represented by general formula (1):

[Chemical formula 2]

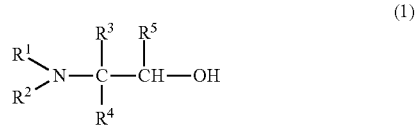

wherein $R^1$ represents a cycloalkyl group which has 3 to 6 carbon atoms and in which a part of hydrogen atoms is substituted or unsubstituted by an alkyl group having 1 to 3 carbon atoms; $R^2$ represents an alkyl group having 1 to 3 carbon atoms or a hydrogen atom; $R^3$ and $R^4$ each independently represent an alkyl group having 1 to 3 carbon atoms or a hydrogen atom; and $R^5$ represents an alkyl group having 1 to 3 carbon atoms.

Steric hindrance in amine compounds have hitherto been known to significantly affect products in the absorption of carbon dioxide and has an advantage for the production of bicarbonate ions that exhibits a low heat of reaction. Bicarbonate ions are known to be dissociated by a lower energy in the emission of carbon dioxide. Based on such finding, the inventor of the present application has made studies on attainment of a better steric hindrance effect and, as a result, has found that compounds represented by general formula (1) (for example, particularly preferably 1-cyclopentylamino-2-propanol) provide a lower heat of reaction and can enhance the amount of carbon dioxide outgassed.

Specifically, amine compounds represented by general formula (1) (hereinafter referred to sometimes as "amine compounds (1)") have a structure that includes a secondary alcohol including a hydrocarbon group containing an amino group and a hydrocarbon group ($R^5$) having 1 to 3 carbon atoms that have been bonded to a carbon atom with a hydroxyl group bonded thereto, a cycloalkyl group having been bonded directly to a nitrogen atom in the amino group. Thus, the secondary alcohol including a cycloalkyl group bonded to a nitrogen atom can particularly accelerate outgassing of carbon dioxide from the absorbing agent.

The amine compound (1) including a cycloalkyl group bonded directly to a nitrogen atom in an amino group has a structure having a large steric hindrance. Therefore, the amine compound (1) absorbs carbon dioxide ($CO_2$) as bicarbonate ions, contributing to a high acidic gas absorption amount.

Thus, in the amine compound (1), because the alkyl group $R^1$ bonded directly to the nitrogen atom in the amino group forms a cyclic structure, the heat of reaction in the reaction with the acidic gas is lower than that in the case where the alkyl group $R^1$ does not form a cyclic structure, that is, where $R^1$ represents a straight-chain alkyl group or a branched-chain alkyl group.

An acidic gas absorbing agent having a high capability of absorbing acidic gases can be obtained by dissolving the amine compound (1), for example, in a solvent such as water.

The following embodiment will be described by taking, as an example, the case where the acidic gas is carbon dioxide. However, it should be noted that the acidic gas absorbing agent in an embodiment of the present invention can offer the same effect for other acidic gases such as hydrogen sulfide.

In the amine compound (1), $R^1$ represents a cycloalkyl group having 3 to 6 carbon atoms. Saturated cycloalkyl groups are preferred as $R^1$. Among them, saturated cycloalkyl groups having 5 or 6 carbon atoms, specifically a cyclopentyl or cyclohexyl group, are particularly preferred. In the cycloalkyl groups, a part of hydrogen atoms may be optionally substituted by a substituted or unsubstituted alkyl group having 1 to 3 carbon atoms.

When the number of carbon atoms in $R^1$ is 7 or more, for example, in an amine compound in which $R^1$ represents a cycloheptyl group, the solubility in solvents such as water is lowered, resulting in a lowered acidic gas recovering capability.

$R^2$ represents an alkyl group having 1 to 3 carbon atoms or a hydrogen atom and preferably represents a methyl group or a hydrogen atom from the viewpoint of solubility.

$R^3$ and $R^4$ each independently represent an alkyl group having 1 to 3 carbon atoms or a hydrogen atom and preferably represent a methyl group or a hydrogen atom from the viewpoint of solubility.

$R^5$ represents an alkyl group having 1 to 3 carbon atoms. Methyl, ethyl, n-propyl, and isopropyl groups may be mentioned as $R^5$. A methyl group is more preferred.

In the acidic gas absorbing agent in an embodiment of the present invention, a plurality of kinds of amine compounds (1) that are different from each other in $R^1$ to $R^5$ may be used in combination.

Specific examples of preferred amine compounds (1) used in the acidic gas absorbing agent in the embodiment of the present invention include the following compounds:
1-cyclopropylamino-2-propanol,
1-cyclobutylamino-2-propanol,
1-cyclopentylamino-2-propanol,
1-cyclohexylamino-2-propanol,
1-cyclopropylamino-2-butanol,
1-cyclobutylamino-2-butanol,
1-cyclopentylamino-2-butanol,
1-cyclohexylamino-2-butanol,
1-cyclopropylamino-2-pentanol,
1-cyclobutylamino-2-pentanol,
1-cyclopentylamino-2-pentanol,
1-cyclohexylamino-2-pentanol,
1-(N-cyclopropyl-N-methylamino-)-2-propanol,
1-(N-cyclobutyl-N-methylamino)-2-propanol,
1-(N-cyclopentyl-N-methylamino)-2-propanol,
1-(N-cyclohexyl-N-methylamino)-2-propanol
1-(N-cyclopropyl-N-methylamino)-2-butanol,
1-(N-cyclobutyl-N-methylamino)-2-butanol,
1-(N-cyclopentyl-N-methylamino)-2-butanol,
1-(N-cyclohexyl-N-methylamino)-2-butanol,
1-(N-cyclopropyl-N-methylamino)-2-pentanol,
1-(N-cyclobutyl-N-methylamino)-2-pentanol,
1-(N-cyclopentyl-N-methylamino)-2-pentanol, and
1-(N-cyclohexyl-N-methylamino)-2-pentanol.

The acidic gas absorbing agent in which carbon dioxide has been absorbed is regenerated by heating in a high-temperature region around 120° C. Therefore, preferably, the amine compound (1), when heated, releases a large amount of carbon dioxide. Thus, $R^2$ to $R^5$ in the amine compound (1) have a small number of carbon atoms. Accordingly, the content of the amine compound contained in the absorbing agent can be increased, contributing to absorption of a large amount of carbon dioxide. From this viewpoint, preferably, $R^2$ in the amine compound (1) represents hydrogen and the alkyl group in $R^3$ to $R^5$ represents a methyl group.

One compound selected from the above group may be used as the amine compound (1). Alternatively, a mixture of two or more compounds selected from the above group may be used.

The content of the amine compound (1) contained in the acidic gas absorbing agent is preferably 10 to 55% by mass (provided that the total amount of the acidic gas absorbing agent is presumed to be 100% by mass). In general, the higher the concentration of the amine component in the acidic gas absorbing agent, the larger the absorption amount and desorption amount of carbon dioxide per unit volume and, further, the higher the carbon dioxide absorption rate and desorption rate. This is preferred in terms of energy consumption and size of plant facilities, and treatment efficiency. When the concentration of the amine component in the acidic gas absorbing agent is excessively high, water contained in the acidic gas absorbing agent does not satisfactorily exert a function as an activating agent for the absorption of carbon dioxide. When the concentration of the amine component in the acidic gas absorbing agent is excessively high, for example, the viscosity of the acidic gas absorbing agent is sometimes disadvantageously increased.

When the content of the amine compound (1) is not more than 55% by mass, phenomena such as an increase in viscosity of the acidic gas absorbing agent and a deterioration in a function of water as the activating agent are not observed. Further, when the content of the amine compound (1) is not less than 10% by mass, satisfactory carbon dioxide absorption amount and absorption rate can be obtained, making it possible to obtain an excellent treatment efficiency.

The use of an acidic gas absorbing agent having an amine compound (1) content in the range of 10 to 55% by mass for carbon dioxide recovery purposes is advantageous in that a large acidic gas absorption amount and a high acidic gas absorption rate can be realized and, at the same time, a large acidic gas desorption amount and a high acidic gas desorption rate can be realized. Accordingly, the acidic gas can be advantageously recovered with a high efficiency. The content of the amine compound (1) is more preferably 20 to 50% by mass.

<Reaction Accelerator>

The amine compound (1) can be used as a mixture with a reaction accelerator including an alkanolamine compound and/or a heterocycloamine compound represented by general formula (2) (hereinafter referred to sometimes as "heterocycloamine compound (2)"). The use of this reaction accelerator can contribute to an improvement in acidic gas absorption amount and recovery amount, an improvement in durability, and a further improvement in stable practice of recovering method and recovering apparatus.

[Chemical formula 3]

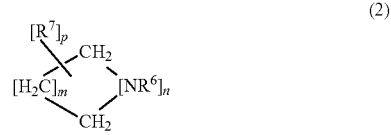

(2)

wherein $R^6$ represents a substituted or unsubstituted alkyl group having 1 to 4 carbon atoms or a hydrogen atom; $R^7$ represents a substituted or unsubstituted alkyl group having 1 to 4 carbon atoms that has been bonded to a carbon atom constituting the hetero ring; n is an integer of 1 to 3; m is an integer of 1 to 4; and p is an integer of 0 to 12, provided that, when n is 2 or 3, there is no direct bonding between nitrogen atoms.

In this embodiment, for example, an aqueous solution of a mixture of the amine compound (1) with a reaction accelerator including an alkanolamine compound and/or a heterocycloamine compound (2) may be used as the acidic gas absorbing agent.

The use of a mixture of the amine compound (1) with the alkanolamine compound and/or the heterocycloamine compound (2) can contribute to a further improvement in amount of acidic gas absorbed per unit mole of the amine compound (1), amount of acidic gas absorbed per unit volume of the acidic gas absorbing agent, and absorption rate of the acidic gas.

Further, the use of a mixture of the amine compound (1) with the alkanolamine compound and/or the heterocycloamine compound (2) is advantageous in that an energy necessary for the separation of acidic gas after the acidic gas absorption (acidic gas desorption energy) and an energy necessary for the regeneration of the acidic gas absorbing agent can be reduced.

Preferred alkanolamines include, for example,
monoethanolamine,
2-amino-2-methyl-1-propanol,
2-amino-2-methyl-1,3-dipropanediol,
methylaminoethanol,
diethanolamine,
bis(2-hydroxy-1-methylethyl)amine,
methyldiethanolamine,
dimethylethanolamine,
diethylethanolamine,
triethanolamine,
dimethylamino-1-methylethanol,
2-methylaminoethanol,
2-(ethylamino)ethanol,
2-propylaminoethanol,
n-butylaminoethanol,
2-(isopropylamino)ethanol,
3-ethylaminopropanol, and
diisopropanolamine.

Among them, at least one compound selected from the group consisting of 2-(isopropylamino)ethanol, 2-(ethylamino)ethanol, and 2-amino-2-methyl-1-propanol is preferred from the viewpoint of further improving reactivity of the amine compound (1) with the acidic gas.

Preferred heterocycloamine compounds (2) include azetidine,
1-methylazetidine,
1-ethylazetidine,
2-methylazetidine,
2-azetidylmethanol,
2-(2-aminoethyl)azetidine,
pyrrolidine,
1-methylpyrrolidine,
2-methylpyrrolidine,
2-butylpyrrolidine,
2-pyrrolidylmethanol,
2-(2-aminoethyl)pyrrolidine,
piperidine,
1-methylpiperidine,
2-ethylpiperidine,
3-propylpiperidine,
4-ethylpiperidine,
2-piperidyl methanol,
3-piperidyl ethanol,
2-(2-aminoethyl)pyrrolidine,
hexahydro-1H-azepine,
hexamethylene-tetramine, and
piperazine compounds (including piperazine and piperazine derivatives).

Among them, piperazine compounds are particularly preferred from the viewpoint of improving carbon dioxide absorption amount and absorption rate of the acidic gas absorbing agent. The piperazine compound is a secondary amine compound. In general, a nitrogen atom in the secondary amino group is bonded to carbon dioxide to form carbamate ions, contributing to an improvement in absorption rate in an early stage of the reaction. Further, the nitrogen atom in the secondary amino group functions to convert carbon dioxide bonded to the nitrogen atom to bicarbonate ions ($HCO_3^-$), contributing to an improvement in conversion rate in a late stage of the reaction.

At least one compound selected from piperazine, 2-methylpiperazine, 2,5-dimethylpiperazine, and 2,6-dimethylpiperazine is more preferred as the piperazine compound.

The content of the reaction accelerator (alkanolamine compound and/or the heterocycloamine compound (2)) is preferably 1 to 20% by mass. When the content of the reaction accelerator in the acidic gas absorbing agent is less than 1% by mass, the effect of improving the acidic gas absorption rate is less likely to be attained. When the content of the reaction accelerator contained in the acidic gas absorbing agent is more than 20% by mass, the viscosity of the absorbing agent is excessively increased, leading to a possibility of lowering the reactivity. The content of the reaction accelerator (alkanolamine compound and/or heterocycloamine compound (2)) is more preferably 5 to 15% by mass.

<Other Ingredients (Optional Ingredients and the Like)

The acidic gas absorbing agent in an embodiment of the present invention includes the amine compound represented by general formula (1), preferably further includes a reaction accelerator including an alkanolamine compound and/or a heterocycloamine compound represented by general formula (2). The acidic gas absorbing agent in this embodiment, when used as a mixture, for example, with a solvent such as water and optionally various auxiliary materials is suitable as an acidic gas absorbing agent, for example, in the acidic gas absorbing method or the acidic gas absorbing apparatus. Here specific examples of auxiliary materials include antioxidants, pH adjusters, antifoaming agents, and corrosion preventive agents.

When water is used as the solvent, the content of water is preferably 40 to 90% by mass, particularly preferably 45 to 70% by mass (the total amount of the acidic gas absorbing agent being presumed to be 100% by mass). A water content in this range is preferred from the viewpoints of an improvement in acidic gas absorption rate and a reduction in viscosity of the absorbing solution.

<Method for Removing Acidic Acid>

The method for removing an acidic gas in an embodiment of the present invention includes bringing a gas containing an acidic gas into contact with an acidic gas absorbing agent in the above embodiment to remove the acidic gas from the gas containing the acidic gas.

The method for removing an acidic gas in an embodiment of the present invention basically includes the steps of: absorbing an acidic gas in the acidic gas absorbing agent in the above embodiment of the present invention (an absorption step); and desorbing the acidic gas from the acidic gas absorbing agent in the above embodiment of the present invention that has absorbed the acidic gas.

The method for removing an acidic gas in an embodiment of the present invention basically includes the steps of: bringing a gas containing an acidic gas (for example, an exhaust gas) into contact with an acidic gas absorbing agent to absorb the acidic gas in the acidic gas absorbing agent (an acidic gas absorption step) and heating the acidic gas absorbing agent with the acidic gas absorbed therein obtained in the acidic gas absorption step to desorb and remove the acidic gas (an acidic gas separation step).

The gas containing the acidic gas can be brought into contact with an aqueous solution containing the acidic gas absorbing agent by any method without particular limitation, and examples of methods for bringing the gas into contact with the aqueous solution include a method in which the gas containing the acidic gas is introduced into the acidic gas absorbing agent by bubbling to absorb the acidic gas into the absorbing agent, a method in which the acidic gas absorbing agent is allowed to fall like mist into a gas stream containing an acidic gas (a misting or spraying method), or a method in which a gas containing an acidic gas is brought into a countercurrent contact with an acidic gas absorbing agent in an absorption vessel containing a porcelain, polymeric, or metallic mesh filler.

The temperature of the acidic gas absorbing agent in the absorption of the gas containing the acidic gas in the aqueous solution is generally room temperature to 60° C., preferably 50° C. or below, more preferably about 20 to 45° C. The lower the temperature of the acidic gas absorbing agent, the larger the amount of the acidic gas absorbed. However, the lower limit of the treatment temperature may be determined, for example, by a gas temperature on the process and a heat recovery target. The pressure in the acidic gas absorption may vary depending upon the pressure in the gas to be treated and is generally a substantially atmospheric pressure or somewhat higher than the atmospheric pressure. The application of pressure to a higher value for absorbing capability enhancement purposes is possible. However, the treatment under an atmospheric pressure or under the pressure of the gas treated is preferred from the viewpoint of reducing energy consumption necessary for compression.

In the step of absorbing an acidic gas, the amount of carbon dioxide absorbed in the absorption of carbon dioxide (40° C.) by an acidic gas absorbing agent including 20 to 55% by mass of the amine compound (1) in the above embodiment is about 0.20 to 0.90 mole per mole of amine contained in the absorbing agent.

Here the acidic gas saturated absorption amount is a value obtained by measuring the amount of carbon dioxide in the acidic gas absorbing agent with an infrared gas concentration measuring apparatus.

Methods for separating the acidic gas from the acidic gas absorbing agent with the acidic gas absorbed therein to recover pure or high-concentration carbon dioxide include a method in which, as in distillation, the acidic gas absorbing agent is heated and foamed in a kettle for desorption of the carbon dioxide, and a method in which a liquid interface is widened and heated in a plate column, a spray tower, or a regeneration tower containing a porcelain, polymeric, or metallic net filler. According to this method, the acidic gas is liberated and released from carbamate anions or bicarbonate ions.

The temperature of the acidic gas absorbing agent in the separation of the acidic gas may be generally 70° C. or above, preferably 80° C. or above, more preferably 90 to 120° C. The higher the temperature, the larger the amount of the acidic gas desorbed. Increasing the temperature, however, leads to an increase in energy necessary for heating of the absorbing solution. Accordingly, the temperature may be determined, for example, by gas temperature on the process and heat recovery target. The pressure in the desorption of the acidic gas is generally carried out around 0.1 to 0.5 MPa, preferably 0.1 to 0.2 MPa (absolute pressure), or alternatively may be carried out under an atmospheric pressure or more. Evacuation to a lower pressure is possible for desorption capability enhancement purposes. From the viewpoint of reducing energy consumption necessary for evacuation, however, the separation under an atmospheric pressure or more is preferred.

The amount of acidic gas absorbed in the desorption of acidic gas (120° C.) in an acidic gas absorbing agent containing 10 to 55% by mass of the amine compound (1) and 1 to 20% by mass of a reaction accelerator in the above embodiment is about 0.02 to 0.20 mole per mole of amine contained in the absorbing agent.

The acidic gas absorbing agent after the separation of the acidic gas may be again supplied to the acidic gas absorption step for recirculation (recycling). Heat generated in the acidic gas absorption is generally heat-exchanged in a heat exchanger to preheat an aqueous solution introduced into the regenerator in a process of recycling of the aqueous solution, whereby the heat is cooled.

The purity of the acidic gas thus recovered is generally very high and about 95 to 99% by volume. The pure acidic gas or high-concentration acidic gas may be used, for example, as chemicals, starting materials for the synthesis of polymeric substances, and cooling materials for food freezing. Further, the recovered acidic gas may also be isolated and stored, for example, in the ground currently under technical development.

Among the above steps, the step of separating the acidic gas from the acidic gas absorbing agent and regenerating the acidic gas absorbing agent is a step that consumes the largest amount of energy, and about 50 to 80% of the total energy in the whole process is consumed in this step. Accordingly, reducing the consumption energy in the step of regenerating the acidic gas absorbing agent can contribute to a reduction in cost of the step of absorbing and separating the acidic gas, and, thus, the removal of the acidic gas from the exhaust gas can be advantageously carried out in a cost-effective manner.

As compared with alkanolamine compounds such as monoethanolamines that have hitherto been used as acidic gas absorbing agents, the amine compound (1) in the above embodiment is much less likely to attack metallic materials such as carbon steels. Accordingly, when this acidic gas absorbing agent is used in the acidic gas removing method, for example, in the construction of plants, there is no need to use high-cost high-grade corrosion-resistant steels. This is advantageous in cost.

In this embodiment, when the acidic gas absorbing agent in the above embodiment is used, the acidic gas can easily be desorbed at elevated temperatures and, thus, the amount of the acidic gas recovered is large, contributing to a reduction in energy necessary for the desorption of acidic gas (step of regeneration). Accordingly, the step of absorbing and separating acidic gas can be carried out under highly cost-effective conditions.

<Acidic Gas Removing Apparatus>

The acidic gas removing apparatus in an embodiment of the present invention includes: an absorber that brings a gas containing an acidic gas into contact with an acidic gas absorbing agent in the above specific embodiment of the present invention to absorb the acidic gas in the acidic gas absorbing agent, thereby removing the acidic gas from the gas containing the acidic gas; and a regenerator that desorbs the acidic gas from the acidic gas absorbing agent with the acidic gas absorbed therein, the acidic gas absorbing agent regenerated in the regenerator being reutilized in the absorber.

FIG. 1 is a schematic view of an acidic gas removing apparatus in an embodiment of the present invention. This acidic gas removing apparatus 1 includes an absorber that brings a gas containing an acidic gas (for example, an exhaust gas) into contact with an acidic gas absorbing agent to absorb the acidic gas in the acidic gas absorbing agent, thereby removing the acidic gas from the gas; and a regenerator 3 that desorbs the acidic gas from the acidic gas absorbing agent with the acidic gas absorbed therein to regenerate the acidic gas absorbing agent. The acid gas removing apparatus will be described by taking, as an example, carbon dioxide as the acidic gas.

As illustrated in FIG. 1, an exhaust gas containing carbon dioxide such as combustion exhaust gas discharged, for example, from thermal electric power plants is passed through a gas supply port and guided to the bottom of the absorber. This exhaust gas is forced into the absorber and brought into contact with an acidic gas absorbing agent that is supplied from an acidic gas absorbing agent supply port provided at an upper part of the absorber and is stored within the absorber. An acidic gas absorbing agent in the above embodiment is used as the acidic gas absorbing agent.

The pH value of the acidic gas absorbing agent may be adjusted to at least 9. The pH value of the acidic gas absorbing agent may be properly adjusted to an optimal value depending, for example, upon type, concentration, and flow rate of harmful gases contained in the exhaust gas. The acidic gas absorbing agent may contain, together with the above amine compound (1) as the indispensable ingredient, solvents such as water and other compounds such as nitrogen-containing compounds that improve a carbon dioxide absorbing capability, antioxidants, and pH adjusters at any desired ratio.

Thus, when the exhaust gas comes into contact with the acidic gas absorbing agent, carbon dioxide in the exhaust gas is absorbed in the acidic gas absorbing agent and removed from the exhaust gas. The exhaust gas after the removal of carbon dioxide is discharged through a gas discharge port into the outside of the absorber.

The solution of the acidic gas absorbing agent with carbon dioxide absorbed therein is successively sent from the absorber to the heat exchanger 7 and the heater 8. The heated solution is then supplied to the regenerator 3. The solution of the acidic gas absorbing agent supplied into the regenerator 3 is moved from the upper part to the lower part of the regenerator 3. During the movement, the acidic gas in the acidic gas absorbing agent is desorbed to regenerate the acidic gas absorbing agent.

The acidic gas absorbing agent regenerated in the regenerator 3 is supplied through a pump 9 to the heat exchanger 7 and an absorbing solution cooler 10 and is returned to the absorber through the acidic gas absorbing agent supply port 5.

On the other hand, the carbon dioxide separated from the acidic gas absorbing agent comes into contact with refluxed water supplied from a refluxing drum 11 at an upper part of the regenerator 3 and is discharged into the outside of the regenerator 3.

The refluxed water with carbon dioxide dissolved therein is cooled in a reflux condenser 12 and, in the refluxing drum 11, is separated from a liquid component produced as a result of condensation of water vapor containing carbon dioxide. The liquid component is led to an acidic gas recovery step through a recovered acidic gas line 13.

On the other hand, the refluxed water with the acidic gas separated therefrom is supplied to the regenerator 3 through a refluxed water pump 14.

The acidic gas removing apparatus in this embodiment can realize the absorption and removal of acidic gas with a high efficiency through the utilization of an acidic gas absorbing agent having excellent acidic gas absorbing properties and desorbing properties.

EXAMPLES

The present invention is further illustrated by the following Examples and Comparative Examples that are not intended as a limitation of the invention.

Example 1

Both 1-cyclopentylamino-2-propanol as an amine compound (1) and piperazine as a reaction accelerator were dissolved in water to prepare 50 ml of an aqueous solution (hereinafter referred to as "absorbing solution") containing 45% by mass of 1-cyclopentylamino-2-propanol and 5% by mass of piperazine. This absorbing solution was filled into a testing tube and was heated to 40° C., and a mixed gas containing 10% by volume of carbon dioxide ($CO_2$) and 90% by volume of nitrogen ($N_2$) was blown at a flow rate of 400 mL/min into the testing tube, and the concentration of carbon dioxide ($CO_2$) in gas at the outlet of the testing tube was measured with an infrared gas concentration measuring apparatus (tradename "CGT-700," manufactured by Shimadzu Seisakusho Ltd.) to evaluate an absorbing capability. An amount at the time when the concentration of $CO_2$ at an inlet was identical to the concentration of $CO_2$ at an outlet of the absorbing solution was regarded as a saturated absorption amount.

The absorbing solution (30 mL) before the absorption was placed in a pressure-resistant stainless steel vessel and was heated to 120° C., and the above mixed gas was blown into the vessel at a flow rate of 100 mL/min. A back-pressure regulating valve is installed so that the pressure within the vessel is 2 atm. The concentration of carbon dioxide ($CO_2$) in gas discharged from an output of the stainless steel vessel was measured with an infrared gas concentration measuring apparatus (tradename "CGT-700," manufactured by Shimadzu Seisakusho Ltd.) to evaluate an absorbing capability. An amount at the time when the concentration of $CO_2$ in the absorbing solution at the outlet was identical to the concentration of $CO_2$ in the absorbing solution at the inlet was regarded as the saturated absorption amount.

The heat of reaction was measured as follows. The heat of reaction in the absorption of carbon dioxide in an absorbing solution was measured with a differential thermal reaction calorimeter "DRC Evolution" (tradename, manufactured by SETARAM) including a glass reaction tank and a reference tank that were installed in a thermostatic chamber and had an identical shape. An absorbing solution (150 mL) was filled into each of a reaction tank and a reference tank, and a constant-temperature water of 40° C. was circulated through a jacket of the tanks. In this state, a carbon dioxide gas (concentration: 100%) was blown into the absorbing solution in the reaction tank at 200 mL/min, and a rise in temperature of the absorbing solution was continuously recorded with a temperature recorder until the absorption of carbon dioxide was completed. The heat of reaction was then calculated using a previously measured overall heat transfer coefficient between the reaction tank and water in the jacket.

The amount of carbon dioxide absorbed in the absorbing solution at 40° C. was 50 NL/L, and the amount of carbon dioxide absorbed in the absorbing solution at 120° C. was 4

NL/L/ Therefore, the amount of recovery was 46 NL/L. On the other hand, the heat of reaction was 64 kJ/mol.

Example 2

An absorbing solution was prepared in the same manner as in Example 1, except that 1-cyclohexylamino-2-propanol was used instead of 1-cyclopentylamino-2-propanol. For the absorbing solution, the amount of carbon dioxide absorbed, the amount of recovery, and the heat of reaction at 40° C. and 120° C. were measured with the same apparatus as used in Example 1 under the same conditions as used in Example 1.

The amount of carbon dioxide absorbed in the absorbing solution at 40° C. was 46 NL/L, and the amount of carbon dioxide absorbed in the absorbing solution at 120° C. was 4 NL/L. Accordingly, the amount of recovery was 42 NL/L. On the other hand, the heat of reaction was 63 kJ/mol.

Example 3

An absorbing solution was prepared in the same manner as in Example 1, except that 1-(N-cyclopentyl-N-methylamino)-2-propanol was used instead of 1-cyclopentylamino-2-propanol. For the absorbing solution, the amount of carbon dioxide absorbed, the amount of recovery, and the heat of reaction at 40° C. and 120° C. were measured with the same apparatus as used in Example 1 under the same conditions as used in Example 1.

The amount of carbon dioxide absorbed in the absorbing solution at 40° C. was 36 NL/L, and the amount of carbon dioxide absorbed in the absorbing solution at 120° C. was 3 NL/L. Accordingly, the amount of recovery was 33 NL/L. On the other hand, the heat of reaction was 68 kJ/mol.

Example 4

An absorbing solution was prepared in the same manner as in Example 1, except that 1-(N-cyclohexyl-N-methylamino)-2-propanol was used instead of 1-cyclopentylamino-2-propanol. For the absorbing solution, the amount of carbon dioxide absorbed, the amount of recovery, and the heat of reaction at 40° C. and 120° C. were measured with the same apparatus as used in Example 1 under the same conditions as used in Example 1.

The amount of carbon dioxide absorbed in the absorbing solution at 40° C. was 33 NL/L, and the amount of carbon dioxide absorbed in the absorbing solution at 120° C. was 3 NL/L. Accordingly, the amount of recovery was 30 NL/L. On the other hand, the heat of reaction was 67 kJ/mol.

Example 5

An absorbing solution was prepared in the same manner as in Example 1, except that 40% by mass of 1-cyclopentylamino-2-propanol and 5% by mass of 2-(isopropylamino) ethanol were used instead of 45% by mass of 1-cyclopentylamino-2-propanol. For the absorbing solution, the amount of carbon dioxide absorbed, the amount of recovery, and the heat of reaction at 40° C. and 120° C. were measured with the same apparatus as used in Example 1 under the same conditions as used in Example 1.

The amount of carbon dioxide absorbed in the absorbing solution at 40° C. was 52 NL/L, and the amount of carbon dioxide absorbed in the absorbing solution at 120° C. was 6 NL/L. Accordingly, the amount of recovery was 47 NL/L. On the other hand, the heat of reaction was 65 kJ/mol.

Example 6

An absorbing solution was prepared in the same manner as in Example 1, except that 40% by mass of 1-cyclopentylamino-2-propanol and 5% by mass of 2-amino-2-methyl-1propanol were used instead of 45% by mass of 1-cyclopentylamino-2-propanol. For the absorbing solution, the amount of carbon dioxide absorbed, the amount of recovery, and the heat of reaction at 40° C. and 120° C. were measured with the same apparatus as used in Example 1 under the same conditions as used in Example 1.

The amount of carbon dioxide absorbed in the absorbing solution at 40° C. was 53 NL/L, and the amount of carbon dioxide absorbed in the absorbing solution at 120° C. was 6 NL/L. Accordingly, the amount of recovery was 48 NL/L. On the other hand, the heat of reaction was 66 kJ/mol.

Comparative Example 1

3-(2-Pentylamino)-1-propanol and piperazine were dissolved in water to prepare 50 ml of an aqueous solution (hereinafter referred to as "absorbing solution") containing 45% by mass of 3-(2-pentylamino)-1-propanol and 5% by mass of piperazine. Thereafter, for the absorbing solution, the amount of carbon dioxide absorbed, the amount of recovery, and the heat of reaction at 40° C. and 120° C. were measured with the same apparatus as used in Example 1 under the same conditions as used in Example 1.

The amount of carbon dioxide absorbed in the absorbing solution at 40° C. was 48 NL/L, and the amount of carbon dioxide absorbed in the absorbing solution at 120° C. was 8 NL/L. Accordingly, the amount of recovery was 40 NL/L. On the other hand, the heat of reaction was 66 kJ/mol.

Comparative Example 2

Measurement was carried out in the same manner as in Comparative Example 1, except that 1-(N-2-pentyl-N-methylamino)-2-propanol was used instead of 3-(2-pentylamino)-1-propanol.

The amount of carbon dioxide absorbed in the absorbing solution at 40° C. was 32 NL/L, and the amount of carbon dioxide absorbed in the absorbing solution at 120° C. was 5 NL/L. Accordingly, the amount of recovery was 27 NL/L. On the other hand, the heat of reaction was 69 kJ/mol.

For the absorbing solutions of Examples 1 and 2 where secondary amine compounds (1) containing a cyclopentyl group or a cyclohexyl group, both the amount of carbon dioxide absorbed and the amount of carbon dioxide collected were higher and the heat of reaction in the absorption of carbon dioxide was low, that is, the absorbing capability of carbon dioxide was better, as compared with Comparative Example 1 where a secondary amine compound containing a straight-chain alkyl group and a primary alcohol group was used.

For the absorbing solutions of Examples 3 and 4 where tertiary amine compounds containing a cyclopentyl group or a cyclohexyl group were used, both the amount of carbon dioxide absorbed and the amount of carbon dioxide collected were higher and the heat of reaction in the absorption of carbon dioxide was low, that is, the absorbing capability of carbon dioxide was better, as compared with Comparative Example 2 where a tertiary amine compound containing a straight-chain alkyl group and a secondary alcohol group was used.

For the absorbing solutions of Examples 5 and 6 where combinations of secondary amine compounds (1) containing a cyclopentyl group or a cyclohexyl group and further 2-(isopropylamino)ethanol or 2-amino-2-methyl-propanol were used, both the amount of carbon dioxide absorbed and the amount of carbon dioxide collected were higher and the heat of reaction in the absorption of carbon dioxide was low, that is, the absorbing capability of carbon dioxide was better, as compared with Comparative Example 1 where a secondary amine compound containing a straight-chain alkyl group and a primary alcohol group was used.

In the acidic gas absorbing agent, the acidic gas removing method, and the acidic gas removing apparatus in at least one of the above embodiments, the absorption amount of acidic gases such as carbon dioxide can be enhanced, and, at the same time, the heat of reaction in the absorption of acidic gas can be lowered.

DESCRIPTION OF REFERENCE CHARACTERS

1 . . . acidic gas removing apparatus, 3 . . . regenerator, 7 . . . heat exchanger, 8 . . . heater, 9 . . . pump, 10 . . . cooler for absorbing solution, 11 . . . reflux drum, 12 . . . reflux condenser, 13 . . . recovered acidic gas line, and 14 . . . reflux water pump

The invention claimed is:

1. An acidic gas absorbing agent comprising:
an amine compound represented by general formula (1); and a reaction accelerator comprising an alkanolamine compound and/or a heterocycloamine compound represented by general formula (2) in an amount of 1 to 20% by mass:

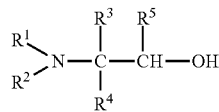
(1)

wherein $R^1$ represents a cycloalkyl group which has 5 ring carbon atoms which are unsubstituted or substituted with an alkyl group having 1 to 3 carbon atoms; $R^2$ represents an alkyl group having 1 to 3 carbon atoms or a hydrogen atom; $R^3$ and $R^4$ each independently represent an alkyl group having 1 to 3 carbon atoms or a hydrogen atom; and $R^5$ represents an alkyl group having 1 to 3 carbon atoms,

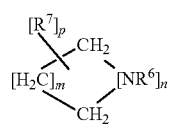
(2)

wherein $R^6$ represents a substituted or unsubstituted alkyl group having 1 to 4 carbon atoms or a hydrogen atom; $R^7$ represents a substituted or unsubstituted alkyl group that has 1 to 4 carbon atoms and is bonded to a carbon atom constituting a hetero ring; n is an integer of 1 to 3; m is an integer of 1 to 4; and p is an integer of 0 to 12, provided that, when n is 2 or 3, direct bonding between nitrogen atoms is absent.

2. The acidic gas absorbing agent according to claim 1, wherein the alkanolamine compound is at least one compound selected from the group consisting of 2-(isopropylamino)ethanol and 2-amino-2-methyl-1-propanol.

3. The acidic gas absorbing agent according to claim 1, wherein, in the amine compound represented by general formula (1), $R^5$ represents a methyl group.

4. The acidic gas absorbing agent according to claim 1, wherein, in the amine compound represented by general formula (1), $R^2$ represents a methyl group.

5. The acidic gas absorbing agent according to claim 1, wherein, in the amine compound represented by general formula (1), $R^2$ represents a hydrogen atom.

6. The acidic gas absorbing agent according to claim 1, wherein the heterocycloamine compound is at least one compound selected from the group consisting of piperazine compounds.

7. The acidic gas absorbing agent according to claim 6, wherein the piperazine compound is at least one compound selected from the group consisting of piperazine, 2-methylpiperazine, 2,5-dimethylpiperazine, and 2,6-dimethylpiperazine.

8. An acidic gas absorbing agent comprising:
an amine compound represented by general formula (1):

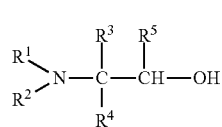
(1)

wherein $R^1$ represents a cycloalkyl group which has 5 ring carbon atoms which are unsubstituted or substituted with an alkyl group having 1 to 3 carbon atoms; $R^2$ represents an alkyl group having 1 to 3 carbon atoms or a hydrogen atom; $R^3$ and $R^4$ each independently represent an alkyl group having 1 to 3 carbon atoms or a hydrogen atom; and $R^5$ represents an alkyl group having 1 to 3 carbon atoms, and
wherein the content of the amine compound represented by general formula (1) in the acidic gas absorbing agent is 10 to 55% by mass.

9. The acidic gas absorbing agent according to claim 8, wherein, in the amine compound represented by general formula (1), $R^5$ represents a methyl group.

10. The acidic gas absorbing agent according to claim 8, wherein, in the amine compound represented by general formula (1), $R^2$ represents a methyl group.

11. The acidic gas absorbing agent according to claim 8, wherein, in the amine compound represented by general formula (1), $R^2$ represents a hydrogen atom.

* * * * *